(12) United States Patent
Forsthövel et al.

(10) Patent No.: US 9,381,674 B2
(45) Date of Patent: Jul. 5, 2016

(54) APPARATUS AND METHOD FOR PRODUCING PLASTICS MATERIAL PRE-FORMS FROM A THERMOPLASTIC PLASTICS MATERIAL

(71) Applicant: Krones AG, Neutraubling (DE)

(72) Inventors: Jochen Forsthövel, Regensburg (DE); Konrad Senn, Regensburg (DE)

(73) Assignee: Krones AG, Neutraubling (DE)

( * ) Notice: Subject to any disclaimer, the term of this patent is extended or adjusted under 35 U.S.C. 154(b) by 32 days.

(21) Appl. No.: 14/099,960

(22) Filed: Dec. 8, 2013

(65) Prior Publication Data

US 2014/0167318 A1    Jun. 19, 2014

(30) Foreign Application Priority Data

Dec. 18, 2012   (DE) .......................... 10 2012 112 491

(51) Int. Cl.
| | |
|---|---|
| *B29C 45/06* | (2006.01) |
| *B29B 11/08* | (2006.01) |
| *B29C 45/27* | (2006.01) |
| *B29C 45/04* | (2006.01) |

(Continued)

(52) U.S. Cl.
CPC ............... *B29B 11/08* (2013.01); *B29C 45/045* (2013.01); *B29C 45/0408* (2013.01); *B29C 45/06* (2013.01); *B29C 45/27* (2013.01); *B29C 45/2704* (2013.01); *B29C 45/77* (2013.01); *B29C 45/78* (2013.01); *B29B 2911/14366* (2013.01); *B29B 2911/14413* (2013.01); *B29K 2105/258* (2013.01)

(58) Field of Classification Search
USPC ...................................................... 264/297.3
See application file for complete search history.

(56) References Cited

U.S. PATENT DOCUMENTS 3,833,329 A     9/1974  Ulmachneider et al.
4,299,553 A  *  11/1981  Swaroop ........................ 425/572

(Continued)

FOREIGN PATENT DOCUMENTS

DE    2154441 A1    5/1972
EP    2266778 A2    12/2010

(Continued)

OTHER PUBLICATIONS

European Search Report for related Application 13 197 868.6 Dated Jan. 19, 2016.

(Continued)

*Primary Examiner* — Jacob Thomas Minskey
(74) *Attorney, Agent, or Firm* — Oppedahl Patent Law Firm LLC

(57) ABSTRACT

The invention relates to an apparatus for producing plastics material pre-forms from a thermoplastic plastics material (12) with a device (1) for providing flowable thermoplastic plastics material (12), a hot runner tool (2) arranged downstream of the device (1) and a conveying device (4) having a plurality of cavities (3), wherein the hot runner tool (2) has at least one hot runner (5), which is formed in a face (6) of the hot runner tool (2), and the conveying device (4) has a face (7) in which openings (8) for filling the cavities (3) are formed, wherein the faces (6, 7) of the hot runner tool (2) and of the conveying device (4) are capable of being orientated with respect to each other in such a way that they slide one over the other, wherein at least one opening (8) of a cavity (3) is always positioned above the hot runner (5).

20 Claims, 2 Drawing Sheets

(51) Int. Cl.
    *B29C 45/77*     (2006.01)
    *B29C 45/78*     (2006.01)
    *B29K 105/00*     (2006.01)

(56) References Cited

U.S. PATENT DOCUMENTS

| | | | |
|---|---|---|---|
| 4,828,778 | A | 5/1989 | Gelsomini et al. |
| 5,643,620 | A | 7/1997 | Keine |
| 2004/0091568 | A1* | 5/2004 | Lee ............................ 425/570 |
| 2008/0038401 | A1* | 2/2008 | Manda ........................ 425/549 |
| 2008/0102153 | A1 | 5/2008 | Di Simone |
| 2008/0258353 | A1 | 10/2008 | Hutchinson |
| 2009/0053546 | A1* | 2/2009 | Di Domenico ............... 428/544 |

FOREIGN PATENT DOCUMENTS

| | | |
|---|---|---|
| EP | 2481547 A1 | 8/2012 |
| WO | 03/047831 A1 | 6/2003 |
| WO | 03047834 A1 | 6/2003 |
| WO | 03047831 A1 | 12/2003 |
| WO | 20061045720 A1 | 5/2006 |
| WO | 2008/017139 | 2/2008 |
| WO | 2009023951 | 2/2009 |
| WO | 2011035501 A1 | 3/2011 |

OTHER PUBLICATIONS

European Search Report Mailed June 8, 2015 App No. 13197868.6.

\* cited by examiner

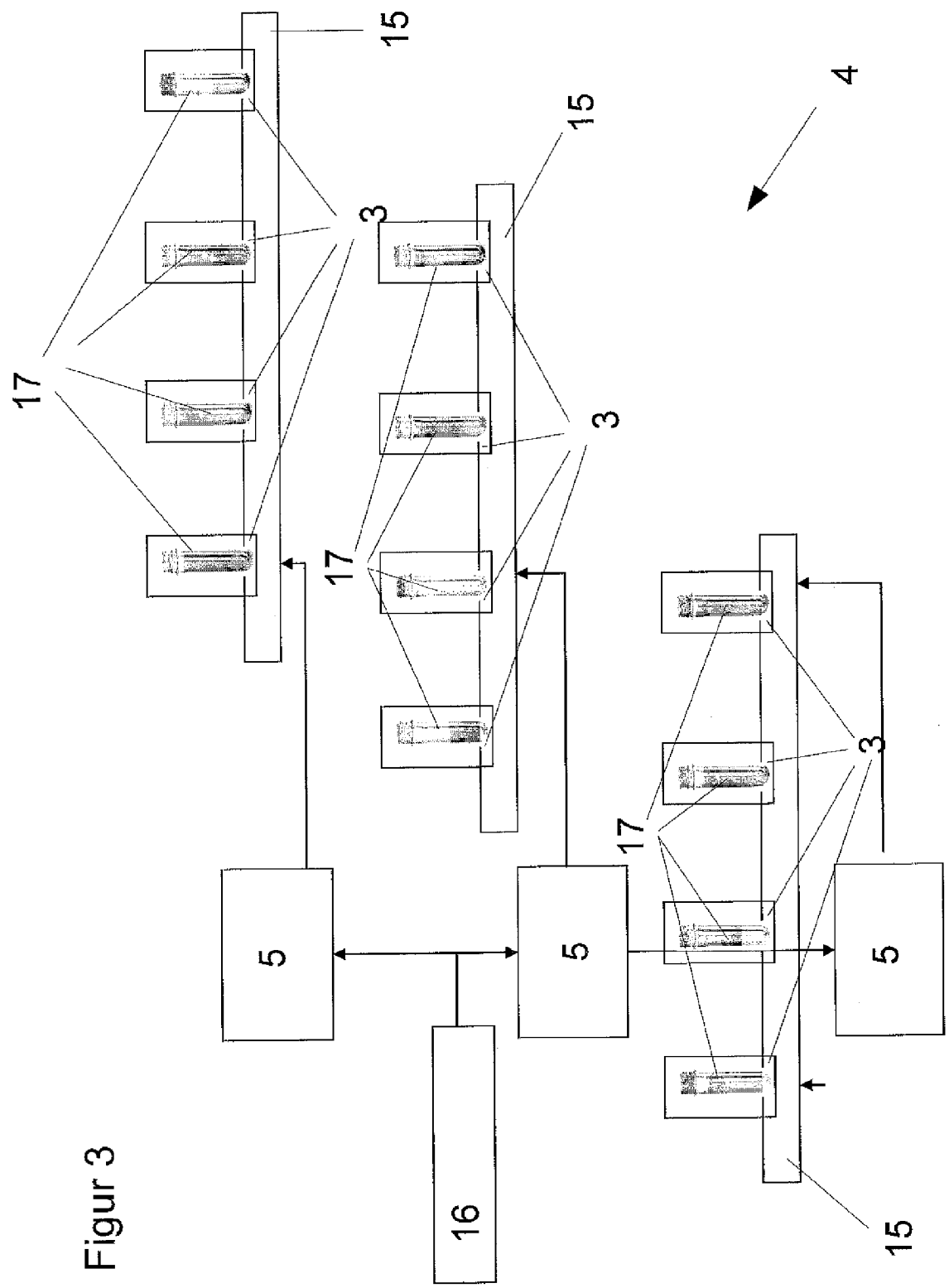
Figur 3

APPARATUS AND METHOD FOR PRODUCING PLASTICS MATERIAL PRE-FORMS FROM A THERMOPLASTIC PLASTICS MATERIAL

BACKGROUND

The invention relates to an apparatus for producing plastics material pre-forms from a thermoplastic plastics material according to the preamble of claim 1. In addition, the invention relates to a method for producing plastics material pre-forms from a thermoplastic plastics material.

Various apparatus and methods for producing plastics material pre-forms from thermoplastic plastics materials are known from the prior art. On the one hand there is the injection moulding method, in which after drying with dry air which has a dew point of between approximately 243 K and approximately 233 K, the plastics material granulate is melted at a temperature of between approximately 513 K and approximately 573 K in an injection unit and is introduced under pressure into the respective cavity for the plastics material pre-forms. The apparatus or tools respectively for producing plastics material pre-forms of this type are as a rule provided with hot runner tools, in which case the melted plastics material is distributed by way of a hot runner distributor to individual cavities in order to produce a plurality of plastics material pre-forms during one moulding cycle.

Customary numbers of cavities in this case are in the range of from 72 to 96. Accordingly, both the machines to be used and the hot runner distributors are relatively large and complex. The hot runner distributors are usually provided with a needle shut-off system or the like, so that the individual ducts of the hot runner distributor can be closed at the end of the process cycle. In this way, no melted plastics material can escape from them when the cavities now filled with melted plastics material are moved away from the hot runner distributor in order to cool the plastics material pre-forms and new empty cavities are positioned on the hot runner distributor for filling with melted plastics material. An apparatus of this type and a method of this type are known for example from DE 2 154 441 A1. A problem in this case, however, is that the melted plastics material cannot be conveyed in a continuous manner, and this results in an inefficient production process, in particular with respect to the energy balance, since the melted plastics material has to be tempered accordingly until it is introduced into the corresponding cavity, so that it may retain its flow properties for introduction into the cavity.

On the other hand, although an apparatus by which the melted plastics material can be conveyed in a continuous manner is known from U.S. Pat. No. 4,828,778 A, it is nevertheless not possible to observe present-day standards with respect to hygiene and cleanness since the extruder nozzle there is at a distance from the carrier element there which contains the cavities for the plastics material pre-forms and which moves the cavities past the extruder nozzle for filling with melted plastics material. The use of an apparatus of this type or of a method of this type respectively in the production of plastics material pre-forms for the foodstuffs or pharmaceuticals industry is questionable since the plastics material can be contaminated over the distance between the extruder nozzle and the cavities if the extrusion is not carried out in ultra-clean or sterile rooms.

In addition, a method known as "Ejection" and a corresponding apparatus are disclosed in WO 2006/045720 A1. In the case of very long parts and very high flow path ratios (quotient of flow path and wall thickness) the problem arises in injection moulding that the plastics material melt freezes (i.e. the free cross-section freezes up from the edge) and the plastics material part to be moulded cannot be shaped out. This problem is solved conventionally in that use is made of a so-called cascade injection moulding. In this case a plurality of injection points, which are used in sequence, are provided along the flow path. As a result, the production process of the long part is subdivided into shorter portions.

The "Ejection" method makes a continuous method from this clock-timed method. A continuous melt duct which is moved past the point of the melt supply replaces the relatively large number of the injection points in the case of cascade injection casting. This method can also be used for the production of parts which are designed almost like profiles capable of being extruded but which have interruptions (for example cable ducts). Nevertheless, on the basis of the method disclosed in WO 2006/045720 A1 and the apparatus there it is not possible to produce plastics material pre-forms.

The object of the invention is therefore to make available an apparatus and a method for producing plastics material pre-forms from a thermoplastic plastics material, in which the melted plastics material can be conveyed into the cavities in a continuous manner in order to form the plastics material pre-forms, while at the same time preventing contamination of the melted plastics material.

This object is attained by an apparatus with the features of claim 1 and by a method with the features of claim 12. Advantageous embodiments of the invention are set out in the sub-claims.

SUMMARY OF THE INVENTION

The apparatus according to the invention for producing plastics material pre-forms from a thermoplastic plastics material has a device for providing flowable thermoplastic plastics material, a hot runner tool arranged downstream of this device and a conveying device having a plurality of cavities. The apparatus according to the invention is characterized in that the hot runner tool has at least one hot runner, which is formed in a face of the hot runner tool, and the conveying device has a face in which openings for filling the cavities are formed. These faces of the hot runner tool and of the conveying device are capable of being orientated with respect to each other in such a way that they slide one over the other, in which case at least one opening of a cavity is always positioned above the hot runner. This formulation, however, should not be understood in such a way that the opening of the at least one cavity is positioned spatially above the hot runner, but rather the at least one opening of a cavity can also be positioned spatially below or even at the side of the hot runner.

On account of this design according to the invention it is possible to convey continuously melted, flowable thermoplastic plastics material under pressure into the hot runner of the hot runner tool, since at least one cavity is always positioned with its opening over the hot runner and can therefore receive melted thermoplastic plastics material. In this case the speed at which the conveying device is moved beyond the hot runner and the pressure at which the melted thermoplastic plastics material is conveyed into the hot runner are preferably adjusted one to the other in such a way that at no moment during the operation does a build-up of plastics material occur inside the hot runner or the hot runner tool respectively.

At each moment at least one cavity is filled with melted thermoplastic plastics material. This ensures that the apparatus can be operated in a particularly efficient manner, in particular with respect to the point of view of energy. On account of the continuous conveying of the melted plastics material it is not necessary to use thermal energy in order to prevent the solidification of the plastics material built up inside the hot runner or the hot runner tool respectively.

In addition, the special orientation of the face of the hot runner tool comprising the hot runner and of the face of the conveying device comprising the openings of the cavities ensures that the melted thermoplastic plastics material is screened off hermetically from extraneous influences and, in this way, contamination is prevented. This is particularly important in view of the fact that the plastics material pre-forms are further processed predominantly in the foodstuffs and pharmaceuticals industry into suitable bottles or similar containers which receive foodstuffs or pharmaceuticals. It goes without saying that contamination of plastics material pre-forms of this type is not acceptable in these branches of industry and is also excluded by corresponding standardization measures.

A further advantage of the apparatus according to the invention as compared with the prior art is also that, as a result of the highly purposeful tempering of the hot runner tool which has a very small structural size and the design thereof which is self-enclosed in conjunction with the conveying device as well as on account of the short residence time—on account of the continuous conveying—of the melted thermoplastic plastics material inside the hot runner, the degradation of material or the shearing of the plastics material melt respectively is minimized. This leads to highly homogeneous results within the structure of the plastics material pre-forms produced, as a result of which high quality standards are also observed in this respect.

In accordance with a first advantageous arrangement of the invention the hot runner tool has adjustment elements by means of which the cross-section of the hot runner is variable over the longitudinal extension thereof. As a result of changing the cross-section of the hot runner over the longitudinal extension thereof it is possible to produce in a simple manner—in the melted thermoplastic plastics material inside the hot runner—temperature and pressure gradients by means of which the filling of the cavities can be optimized in such a way that the plastics material pre-forms produced have a particularly homogeneous structure and thus a very high and uniform quality.

The pressure in the (in particular vertical) hot runner can therefore be set over the cross-section of the duct, in particular in such a way that there is a drop in pressure in the flow direction. As well as the adjustable base elements and/or side elements, installations for the reduction of pressure—which can preferably be retracted and extended—in the course of the melt duct are also possible for this. The pressure could even be increased by adjustable installations on the moulding wheel (on account of a "drag effect" of the moulding wheel rotating away over the hot runner).

Variations of this type in the cross-section of the hot runner can be implemented in that the adjustment elements are designed in the form of adjustable side and/or base elements of the hot runner.

Alternatively or in addition, the hot runner tool and/or the conveying device can have associated with it or them devices for reducing the pressure and/or for increasing the pressure by way of the longitudinal extension of the hot runner. As a result, it is possible for the injection pressure inside the hot runner to be regulated in a particularly precise manner.

In accordance with another advantageous arrangement of the invention the device for providing flowable thermoplastic plastics material is designed in the form of an extruder. In practice, extruders of this type are already very good and well tested in all possible technical fields, so that in this way the melted thermoplastic plastics material can be produced in a highly reliable manner from plastics material granulate. The extruder is operatively connected in this case to the hot runner tool arranged downstream, so that the thermoplastic plastics material is present in the melted state and flowable in the hot runner and is conveyed from there by way of and due to the pressure produced by the extruder into the cavities in which the plastics material pre-forms receive their final shape.

During the further conveying of the conveying device the melted thermoplastic plastics material solidifies so as to form the plastics material pre-forms inside the cavity. The plastics material pre-forms obtained in this way can be further processed inside the apparatus to form the final bottles or containers respectively. It is also possible, however, for the apparatus to be operated as a stand-alone plant in order to produce the plastics material pre-forms which are then further processed at another location inside another plant to form the actual bottles or containers respectively.

In accordance with another concept of the invention both the face of the hot runner tool comprising the hot runner and the face of the conveying device comprising the openings of the cavities are made flat. In this way, these two faces can slide one upon the other in a simple manner, so that a particularly simple hermetic sealing of the melted thermoplastic plastics material inside the hot runner is achieved. In addition, flat faces of this type are much simpler to implement in terms of production and much simpler to manipulate during the operation of the apparatus according to the invention than curved faces adapted one to the other. It is preferable for the hot runner to be arranged in a stationary manner, and for the cavities to be capable of being moved relative to the hot runner, in particular along a circular path. It is thus advantageous for a rotatable carrier to be provided on which the cavities are arranged.

In accordance with a further concept of the invention the conveying device is designed in the form of a moulding wheel, in which case the openings of the cavities are arranged in a radius r on the flat face. This arrangement of the invention affords the advantage for producing the plastics material pre-forms in a conveying device with a rotor process. Rotors of this type can be designed to save considerable space, in which case the hot runner tool engages only point-wise on the conveying device in the present case and it is therefore possible, in contrast to conventional apparatus which are operated in the rotor process, to dispense with energy-intensive hot runner distributor systems over the conveying device as a whole.

In one embodiment of the invention the hot runner is naturally adjusted to a conveying device designed in the form of a moulding wheel of this type. The hot runner is designed in this case in the form of annular segments, in which case it has an internal radius smaller than the radius r and an external radius larger than the radius r. This ensures that during the rotation of the moulding wheel the openings of the cavities can always be guided over the hot runner containing the melted thermoplastic plastics material and, in this way, the cavities can be filled with the melted thermoplastic plastics material.

In accordance with another arrangement of the invention the conveying device has at least one linear carrier element, the openings of the cavities being arranged at a distance, preferably at an equal distance, on the flat face. As a result of this arrangement it is possible for the cavities to be provided in a linear sequence. In this case the cavities are provided in fours on parallel carrier elements, for example on three parallel carrier elements which correspond in each case to a separate hot runner. This plurality of hot runners can be supplied in this case by a single extruder which charges the hot runners in succession. Nevertheless it is also possible for a separate extruder to be provided for each hot runner. The carrier elements on which the shaping cavities are situated would move above the nozzle of the respective hot runner. In this way, four plastics material pre-forms for example can be produced in a "carrier element cycle" with a carrier element with four cavities and 12 plastics material pre-forms for example can then be produced accordingly in a "machine cycle" with three carrier elements with four cavities.

In principle, during the production of the plastics material pre-forms as little material as possible should be processed and used, so that it is desired actually to use the melted plastics material only for the plastics material pre-forms and not to produce waste. On grounds of manipulation, however, it may be desirable for the plastics material pre-forms to be connected to one another by means of a plastics material cord, a plastics material tape or the like and then to be rolled up for example. For the further processing of the plastics material pre-forms such plastics material cords, plastics material tapes or the like would be separated from the plastics material pre-forms in a simple manner. The separated remainders can be processed again into granulate and can be supplied once again to a production process. In order to implement this it is desirable for the face of the conveying device to have ducts which connect openings of adjacent cavities to one another. These ducts are now likewise filled with the melted thermoplastic plastics material by way of the hot runner having the melted thermoplastic plastics material during the movement of the openings of the cavities, the melted thermoplastic plastics material likewise solidifying during the further movement of the conveying apparatus and thus joining together plastics material pre-forms produced in adjacent cavities.

Although a basic concept of the invention consists in as energy-efficient as possible a production of the plastics material pre-forms and so only one hot runner is provided, it may be desirable for a plurality of hot runner to be provided. In particular, this arrangement of the invention is advisable if plastics material pre-forms are to be produced in a multi-layer method for specified applications. Although the energy consumption increases significantly as a result of the plurality of hot runners, the energy balance is nevertheless considerably better than in the case of the multi-layer methods from the prior art, since there the energy balance is impaired with each additional layer as compared with the invention.

The moulding of the plastics material pre-forms could be carried out both in conventional injection moulding and in injection compression moulding. The method is also possible in the form of a multi-layer method with a plurality of melt ducts or with a co-extruded melt in the hot runner. It is advantageous for the hot runner to extend in a peripheral direction or along at least one circular line respectively.

The method according to the invention for producing plastics material pre-forms from a thermoplastic plastics material comprises the following steps
  a) melting of thermoplastic plastics material granulate,
  b) continuous introduction of the melted thermoplastic plastics material under pressure in a hot runner of a hot runner tool,
  c) movement (in particular continuous) of a conveying device comprising a plurality of cavities, having a face which comprises openings of the cavities, by way of a face of the hot runner tool, at least one opening of a cavity always being positioned above the hot runner.

As a result of the fact that the conveying device is moved continuously and that melted thermoplastic plastics material is introduced continuously under pressure into the hot runner, the cavities are also filled continuously with the melted thermoplastic plastics material, which solidifies during the further movement of the conveying device, as a result of which the plastics material pre-forms receive their final shape.

In accordance with a first arrangement of the method according to the invention the temperature of the melted thermoplastic plastics material is varied over the longitudinal extension of the hot runner. As already mentioned in the case of the description of the apparatus according to the invention, a particularly homogeneous structure of the plastics material pre-forms produced and, in this way, a particularly good quality thereof can be achieved as a result.

The arrangement of the method according to the invention is aimed in the same direction, according to which the pressure at which the melted thermoplastic plastics material is conveyed through the hot runner is varied over the longitudinal extension of the hot runner. This has also already been mentioned in the description of the apparatus according to the invention.

Further aims, advantages, features and possibilities of application of the present invention are evident from following description of embodiments with reference to the drawings. In this case all the features described and/or illustrated pictorially form per se or in any suitable combination the subject matter of the present invention, also in a manner independent upon the summary thereof in the claims or the back reference thereof.

DRAWINGS

FIG. 3 shows an embodiment of an apparatus according to the invention with a conveying apparatus with three linear carrier elements in a diagrammatic illustration.

DETAILED DESCRIPTION

Figure 1:
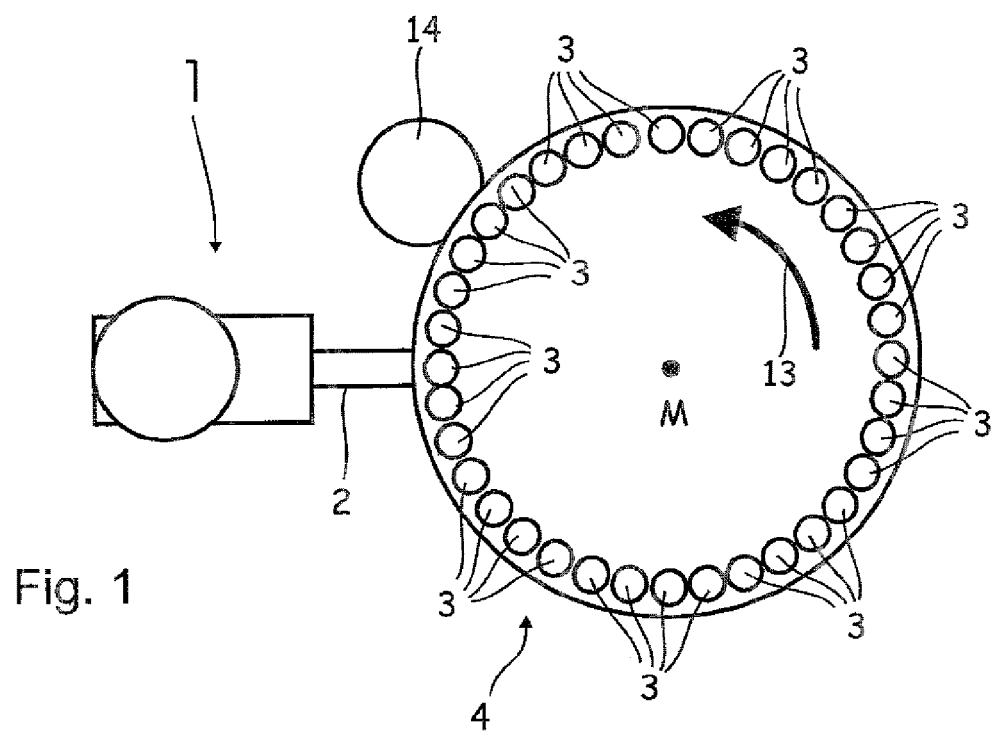
FIG. 1 is a diagrammatic illustration of an embodiment of an apparatus according to the invention.

FIG. 1 is a diagrammatic illustration of an embodiment of an apparatus according to the invention for producing of plastics material pre-forms from a thermoplastic plastics material 12. It essentially comprises a device 1 for providing of flowable thermoplastic plastics material 12 (cf. FIG. 2), to which device 1 is attached a hot runner tool 2, a conveying device 4 for cavities 3 and a removal device 14.

In the present embodiment the device 1 is designed in the form of an extruder. This extruder has supplied to it a granulate of a thermoplastic plastics material which is melted in the extruder and is pressed into the hot runner tool 2 under pressure. The hot runner tool 2 has in the present case a hot runner 5 into which the melted thermoplastic plastics material 12 is pressed and from whence the latter arrives in the cavities 3 by way of openings 8. The precise manner in which this procedure takes place in the apparatus according to the invention is explained in greater detail below in the description of FIG. 2.

In this way, this method is implemented by a continuously operating extruder. In contrast to a conventional hot runner distributor, a melt duct or hot runner respectively in the form of annular segments covers only part of the circle. As a result, the component to be kept hot becomes substantially smaller. Only a melt line or a hot runner respectively is optionally necessary, the residence time and the shearing of the melt (degradation of the material!) preferably likewise become less.

During the pressing of the plastics material 12 into the hot runner 5 only those cavities 3 which are operatively connected to the hot runner 5 by way of their openings 8 can be filled with the melted thermoplastic plastics material 12. The conveying device 4, which is designed in the present case in the form of a moulding wheel and the openings of the cavities 3 of which are at a distance at a radius r from the centre M, rotates in this case about the centre M thereof in the direction of the arrow 13. After the cavities 3 have been filled with the melted thermoplastic plastics material 12, they perform approximately a complete revolution inside the conveying device 4 designed in the form of a moulding wheel. During this time the thermoplastic plastics material 12 cools inside the cavities 3 and solidifies during this, so that the finished plastics material pre-forms can finally be removed out of the conveying device 4 on the removal device 14. After that, the plastics material pre-forms can be supplied in a known manner to a stretch blow moulding machine which shapes the pre-forms into plastics material containers.

Figure 2:
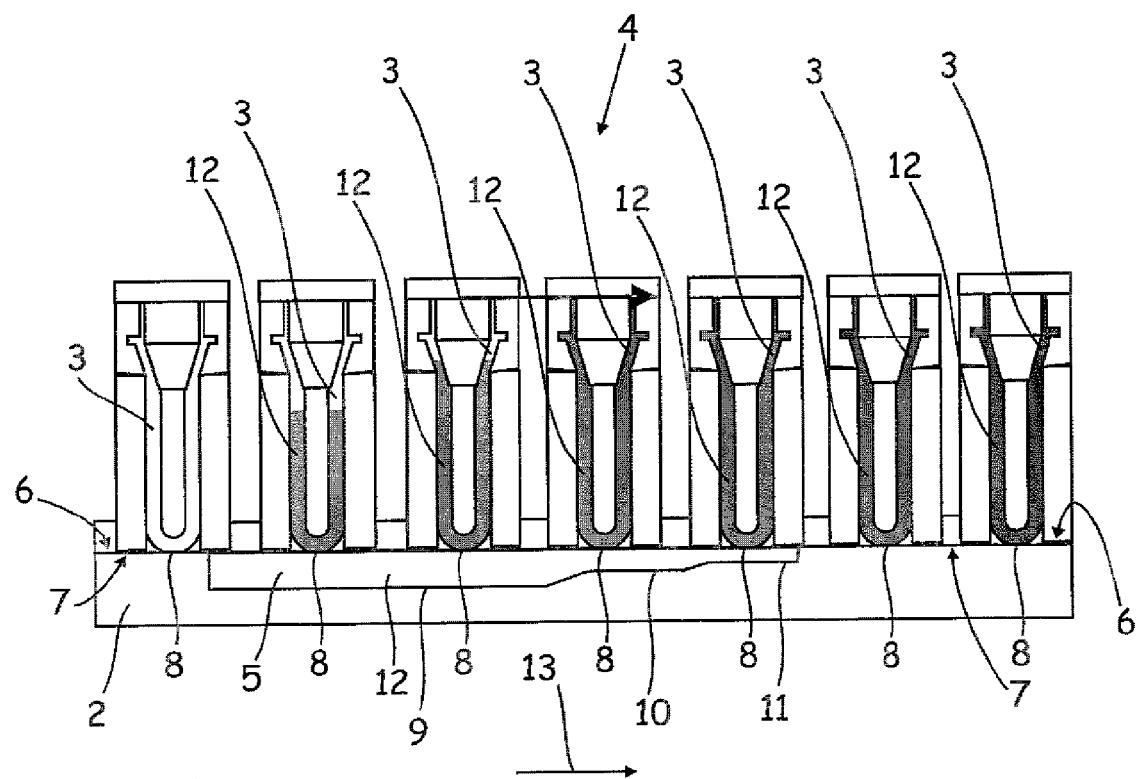
FIG. 2 shows an embodiment of an apparatus according to the invention in a detailed view in a cross-sectional illustration.

The actual region of the apparatus according to the invention which is important to the invention, however, is shown in the detailed illustration of FIG. 2. This cross-sectional illustration shows the embodiment of FIG. 1 in the region of the filling of the cavities 3 with melted thermoplastic plastics material 12. It is evident from the shape of the cavities 3 that PET pre-forms for PET bottles can be produced from PET granulate with the apparatus shown here.

In this case it is also clearly evident that a hot runner 5 which in this illustration is already filled with melted thermoplastic plastics material is formed in the hot runner tool 2. With the exception of the hot runner 5 the hot runner tool 2 has a flat face 6 on its side facing the conveying device 4. A face 7 of the conveying device 4 facing the hot runner tool 2 is adapted to this face 6. In this case the faces 6 and 7 of the hot runner tool 2 and of the conveying device 4 respectively close the hot runner 5 off hermetically from its surroundings, so that no contamination of the melted thermoplastic plastics material 12 in the hot runner 5 can occur. If the extruder and the starting granulate are also not contaminated, this ensures that no contamination of the plastics material pre-forms to be produced occurs.

In addition, as a result of the hermetic partitioning-off of the hot runner 5 by means of the faces 6 and 7 resting against each other, the energy efficiency is also optimized since no energy in the form of heat can be dissipated directly out of the hot runner 5 to the surroundings. The energy introduced into the hot runner 5 in the form of heat can be dissipated only by way of the hot runner tool 2 or the conveying device 4. If these two elements have a suitable poor thermal conductivity away from the hot runner 5, the apparatus is therefore operated accordingly in an energy-efficient manner.

The base elements of the hot runner 5 are designed in the present case in the form of adjustment elements 9, 10 and 11 by which the cross-section of the hot runner 5 can be set in a variable manner. In the present case the cross-section of the hot runner 5 is reduced in the direction 13, and this corresponds to the direction of movement of the conveying device. This cross-sectional reduction is achieved by the adjustment elements 9, 10 and 11 being raised to an increasingly greater degree in the direction of movement 13 of the conveying device. The adjustment element 10 is raised with respect to the adjustment element 9 and the adjustment element 11 is raised with respect to the adjustment element 10. This has the result that the pressure in the flow direction of the melted plastics material 12 decreases inside the hot runner.

In the illustration of FIG. 2 it is additionally clearly evident that the second and third cavities 3 from the left are just filled with liquid thermoplastic plastics material 12, whereas the four cavities 3 arranged to the right of the latter have already been filled. Although the fourth and fifth cavities 3 from the left have already been completely filled, they are still situated with their openings 8 above the hot runner 5, so that the melted thermoplastic plastics material 12 present in them still exerts a counter pressure upon the plastics material already solidifying in the fourth and fifth cavities 3 from the left.

A large hot runner star wheel provided in the prior art in the injection moulding or injection compression moulding is replaced within the scope of the present invention by a melt duct relative to which the cavities move. This hot runner preferably covers only that region of the wheel in which injection actually takes place, but not the part in which cooling or removal takes place in any case. This means that the hot runner 5 preferably covers only a partial area or partial circle respectively of the wheel or the cavities 3 present in it respectively. In addition, at least two hot runners 5 can also be provided, which can preferably cover different partial areas of the conveying device 4 in each case.

The two right-hand cavities 3 likewise already filled with plastics material 12 are already closed, however, since the openings 8 thereof are covered by the face 6 of the hot runner tool 2. As soon as the plastics material 12 in the cavities 3 has solidified in such a way that it has lost its flowability, the opening 8 need no longer be kept closed since the plastics material can no longer flow out of the cavity 3. Accordingly the hot runner tool 2 has dimensions such that as the conveying device moves further the openings 8 of the cavities are freed. In this respect this also results in a saving of material since even if the hot runner tool 2 need not be heated in this region, it need not be guided around the entire conveying device 4. The hot runner tool 2 is therefore preferably arranged in a stationary manner on the rotating conveying device 4.

If the cavities 3 are conveyed further through the conveying device 4, the cavity 3 furthest to the left is moved with its opening 8 over the hot runner, so that the filling thereof with melted thermoplastic plastics material 12 can also now start. In this case the cavities 3 not yet completely filled in FIG. 2 are now completely filled and are moved in the direction 13 towards the removal device 14. In particular, FIG. 2 shows very clearly the continuous operation of the apparatus and the method, without melted thermoplastic plastics material 12 dwelling without movement in the hot runner 5 or the hot runner tool 2 respectively on account of process timing.

The apparatus according to the invention could also have arranged downstream of it a further machine which shapes the plastics material pre-forms formed in this way directly into plastics material containers, such as for example a blow moulding machine, in particular a stretch blow moulding machine. In this case it would be possible for a blow moulding machine of this type to have a heating device such as a continuous furnace in which the plastics material pre-forms are heated or are brought to the shaping temperature respectively. It would also be possible, however, for this blow moulding machine to adjoin the apparatus according to the invention directly, since the latter is discharging plastics material pre-forms which are already hot. In addition, although a heating device is provided, it would be possible for it not to have to heat the plastics material pre-form as much as in the prior art, since they are discharged already heated from the apparatus according to the invention.

FIG. 3 shows by way of example three linear carrier elements 15 of a conveying device 4 (not shown in detail here). Instead of the arrangement on a turntable as illustrated in FIG. 1, in this case the cavities 3 are arranged in a linear sequence. In the present example of FIG. 3 four cavities 3 are arranged in each case on three parallel carrier elements 15 which are supplied in each case from a separate hot runner 5 (not shown here). These hot runners 5 are in turn supplied by an individual extruder 16 which feeds the hot runners 5 in sequence. The carrier elements 15 on which the shaping cavities 3 are arranged are moved over the nozzle of the respective hot runner, so that four plastics material pre-forms 17 for example are capable of being produced in a "carrier element cycle" and twelve plastics material pre-forms 17 for example are then capable of being produced in a corresponding manner in a "machine cycle". The number of the carrier elements and the cavities can be selected in any manner desired.

The Applicants reserve the right to claim all the features disclosed in the application documents as being essential to the invention either individually or in combination, insofar as they are novel either individually or in combination as compared with the prior art.

LIST OF REFERENCES

1 device
2 hot runner tool
3 cavity
4 conveying device
5 hot runner
6 face
7 face
8 opening
9 adjustment element
10 adjustment element
11 adjustment element
12 plastics material
13 direction
14 removal element
15 carrier elements
16 extruder
17 plastics material pre-form
r radius
M centre

The invention claimed is:

1. An apparatus for producing of plastics material pre-forms from a thermoplastic plastics material (12) with
   a device (1) for providing flowable thermoplastic plastics material (12),
   a hot runner tool (2) arranged downstream of the device (1) and
   a conveying device (4) having a plurality of cavities (3), wherein
   the hot runner tool (2) has at least one hot runner (5), which is formed in a face (6) of the hot runner tool (2), and the conveying device (4) has a face (7) in which openings (8) for filling the cavities (3) are formed, wherein the faces (6, 7) of the hot runner tool (2) and of the conveying device (4) are capable of being orientated with respect to each other in such a way that they slide one over the other, wherein at least one opening (8) of a cavity (3) is always positioned above the hot runner (5), wherein the hot runner (5) covers only a partial area or partial circle respectively of a wheel or the cavities (3) present in it respectively and wherein the thermoplastic plastics material (12) is conveyed continuously under pressure into the hot runner (5) of the hot runner tool (2), wherein the hot runner tool (2) has adjustment elements (9, 10, 11) by means of which the cross-section of the hot runner (5) is variable over the longitudinal extension thereof.

2. The apparatus according to claim 1, wherein the adjustment elements (9, 10, 11) are designed in the form of adjustable side and/or base elements of the hot runner (5).

3. The apparatus according to claim 1, wherein the hot runner tool (2) has associated with it devices for reducing the pressure by way of the longitudinal extension of the hot runner.

4. The apparatus according to claim 1, wherein the conveying device (4) has associated with it devices for increasing the pressure by way of the longitudinal extension of the hot runner.

5. The apparatus according to claim 1, wherein the device (1) is designed in the form of an extruder.

6. The apparatus according to claim 1, wherein the faces (6, 7) are made flat.

7. The apparatus according to claim 6, wherein the conveying device (4) is designed in the form of a moulding wheel, wherein the openings (8) of the cavities (3) are arranged in a radius (r) on the flat face (7).

8. The apparatus according to claim 7, wherein the hot runner (5) is designed in the form of annular segments, and has an internal radius smaller than the radius (r) and an external radius larger than the radius (r).

9. The apparatus according to claim 6, wherein the conveying device (4) has at least one linear carrier element (15), wherein the openings (8) of the cavities (3) are arranged at a distance, preferably at an equal distance, on the flat face (7).

10. The apparatus according to claim 1, wherein a plurality of hot runners (5) are provided.

11. The apparatus according to claim 1, wherein the face (7) of the conveying device has ducts which connect openings (8) of adjacent cavities (3) to one another.

12. The apparatus according to claim 1, wherein at each moment at least one cavity is filled with melted thermoplastic plastics material.

13. The apparatus according to claim 1, wherein the thermoplastic plastics material is conveyed into the cavities in which the plastics material pre-forms receive their final shape.

14. The apparatus according to claim 1, wherein the hot runner is arranged in a stationary manner and the cavities are capable of being moved relative to the hot runner.

15. The apparatus according to claim 1, wherein during the further conveying of the conveying device the melted thermoplastic plastics material solidifies so as to form the plastics materiel pre-forms inside the cavity.

16. A method for producing plastics material pre-forms from a thermoplastic plastics material (12), wherein
   a) thermoplastic plastics material granulate is melted,
   b) the melted thermoplastic plastics material (12) is introduced continuously under pressure in a hot runner (5) of a hot runner tool (2),
   c) a conveying device (4) comprising a plurality of cavities (3), having a face (7) which comprises openings (8) of the cavities (3), is guided by way of a face (6) of the hot runner tool (2), wherein at least one opening (8) of a cavity (3) is always positioned above the hot runner (5) and wherein the hot runner (5) covers only a partial area or partial circle respectively of a wheel or the cavities (3) present in it respectively, wherein the hot runner tool (2) has adjustment elements (9, 10, 11) by means of which the cross-section of the hot runner (5) is variable over the longitudinal extension thereof.

17. The method according to claim 16, wherein the temperature of the melted thermoplastic plastics material (12) is varied over the longitudinal extension of the hot runner (5).

18. The method according to claim 16, wherein the pressure at which the melted thermoplastic plastics material (12) is conveyed through the hot runner (5) is varied over the longitudinal extension of the hot runner.

19. The method according to claim 17, wherein the pressure at which the melted thermoplastic plastics material (12) is conveyed through the hot runner (5) is varied over the longitudinal extension of the hot runner.

20. An apparatus for producing plastics material pre-forms from a thermoplastic plastics material (12) with
- a device (1) for providing flowable thermoplastic plastics material (12),
- a hot runner tool (2) arranged downstream of the device (1) and
- a conveying device (4) having a plurality of cavities (3), wherein
- the hot runner tool (2) has at least one hot runner (5), which is formed in a face (6) of the hot runner tool (2), and the conveying device (4) has a face (7) in which openings (8) for filling the cavities (3) are formed, wherein the faces (6, 7) of the hot runner tool (2) and of the conveying device (4) are capable of being orientated with respect to each other in such a way that they slide one over the other, wherein at least one opening (8) of a cavity (3) is always positioned above the hot runner (5), wherein the faces (6, 7) of the hot runner tool (2) and of the conveying device (4) close the hot runner (5) off from its surroundings and wherein the thermoplastic plastics material (12) is conveyed into the cavities (3) in which the plastics material pre-forms receive their final shape, wherein the hot runner tool (2) has adjustment elements (9, 10, 11) by means of which the cross-section of the hot runner (5) is variable over the longitudinal extension thereof.

* * * * *